(12) United States Patent
Khandelwal et al.

(10) Patent No.: US 11,261,202 B2
(45) Date of Patent: Mar. 1, 2022

(54) CATALYTIC REDUCTION OF HALOGENATED CARBOSILANES AND HALOGENATED CARBODISILANES

(71) Applicants: L'Air Liquide, Société Anonyme pour l'Etude et l'Exploitation des Procédés Georges Claude, Paris (FR); AIR LIQUIDE ADVANCED MATERIALS, INC., Branchburg, NJ (US); Manish Khandelwal, Somerset, NJ (US); Reno Pesaresi, Easton, PA (US); Jean-Marc Girard, Versailles (FR)

(72) Inventors: Manish Khandelwal, Somerset, NJ (US); Reno Pesaresi, Easton, PA (US); Jean-Marc Girard, Versailles (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 77 days.

(21) Appl. No.: 16/603,358

(22) PCT Filed: Apr. 7, 2017

(86) PCT No.: PCT/US2017/026568
§ 371 (c)(1),
(2) Date: Oct. 7, 2019

(87) PCT Pub. No.: WO2018/186882
PCT Pub. Date: Oct. 11, 2018

(65) Prior Publication Data
US 2021/0087209 A1    Mar. 25, 2021

(51) Int. Cl.
*C07F 7/08*    (2006.01)
*B01J 31/02*   (2006.01)
*C07F 7/12*    (2006.01)

(52) U.S. Cl.
CPC .......... *C07F 7/083* (2013.01); *B01J 31/0288* (2013.01); *C07F 7/121* (2013.01)

(58) Field of Classification Search
CPC ........ C07F 7/083; C07F 7/121; B01J 31/0288
See application file for complete search history.

(56) References Cited

U.S. PATENT DOCUMENTS

| 4,746,752 | A  | * | 5/1988  | Lepage ................. C07F 7/125 556/469 |
|---|---|---|---|---|
| 5,965,762 | A  |   | 10/1999 | Jung et al. |
| 2008/0319214 | A1 |   | 12/2008 | Geisberger et al. |
| 2012/0114544 | A1 |   | 5/2012  | Jung et al. |

FOREIGN PATENT DOCUMENTS

JP    2014 139144    7/2014

OTHER PUBLICATIONS

Ito, M. et al., Hydrogenation of chlorosilanes by $NaBH_4$, Chem. Lett., 2016, 45, 1434-1436.
International Search Report and Written Opinion for corresponding PCT/US2017/026568, dated Dec. 7, 2017.
Hong, S.H. et al., $[Bu_4P]^+Cl^-$-catalyzed reactions of trichlorosilane and dichloromethylsilane with vinyltrichlorosilane: new synthetic method of 1,1,4,4-tetrachloro-2,5-bis(trichlorosilyl(-1,4-disilacyclohexane compounds, Organometallics 2010, 29, 3054-3057.
Kang, S.H. et al., Phosphonium chloride-catalyzed dehydrochlorinative coupling reactions of alkyl halides with hydridochlorosilanes, Organometallics 2003, 22, 529-534.
Moedritzer, K. et al., The redistribution equilibria of silanic hydrogen with chlorine on methylsilicon moieties, J. Organometal. Chem., 1968, 12, 69-71.

\* cited by examiner

*Primary Examiner* — Pancham Bakshi
(74) *Attorney, Agent, or Firm* — Allen E. White

(57) ABSTRACT

Selective reduction methods for halogenated carbosilanes and carbodisilanes are disclosed. More particularly, high yields of the desired carbosilanes and carbodisilanes are obtained by reduction of their halogenated counterparts using a reducing agent and tetrabutylphosphonium chloride (TBPC) as a catalyst.

11 Claims, 3 Drawing Sheets

CATALYTIC REDUCTION OF HALOGENATED CARBOSILANES AND HALOGENATED CARBODISILANES

CROSS REFERENCE TO RELATED APPLICATIONS

This application is a 371 of International PCT Application PCT/US2017/026568, filed Apr. 7, 2017, the entire contents of which are incorporated herein by reference.

TECHNICAL FIELD

Selective reduction methods for halogenated carbosilanes and carbodisilanes are disclosed. More particularly, high yields of the desired carbosilanes and carbodisilanes are obtained by reduction of their halogenated counterparts using a reducing agent and tetrabutylphosphonium chloride (TBPC) as a catalyst.

BACKGROUND

Carbosilane and carbodisilane precursors are capable of providing films with low dielectric constants useful in semiconductor processing applications. Synthesis and scale-up of carbosilanes and carbodisilanes may be difficult because a mixture of compounds may be produced. For instance, reduction of halogenated silanes by conventional methods is often incomplete. Lithium aluminum hydride (LAH) reduction requires a solvent, such as, ethers, THF or diglyme. See, e.g., U.S. Pat. No. 5,965,762 to Il Nam Jung et al. Incomplete reduction results in partially reduced by-products. Id. Partially reduced by-products make purification of the desired product problematic. The LAH slurry is often heated during product recovery, which involves safety issues. High boiling products are therefore difficult to recover. The yields of the products are often poor (<50% w/w). All of these factors increase the cost of making the targeted compound. Acid work-up reactions also involve safety issues when the products and by-products are flammable and react with water, which results in low yield as well.

A catalytic reduction using tetrabutylammoniumchloride (TBAC) is described by Moedritzer et al. ("The redistribution equilibria of silanic hydrogen with chlorine on methylsilicon moieties", J. Organomet. Chem, vol. 12, 1968, p 69-77). Moedritzer et al. describes a reduction of methyl substituted chlorosilanes by using triethylsilane in the presence of TBAC as catalyst.

Geisberger et al. (U.S. Pat. App. Pub. No. 2008/0319214) disclose preparation of silanes having the general formula $R_aSiH_bX_{4-a-b}$, wherein a=0 or 1; b=2, 3, or 4; X is a halogen atom; R=alkyl, aryl, alkaryl or haloalkyl radical. Geisberger et al. use a disproportionation reaction. Abstract.

Soon Hyun Song et al. disclose the reaction of trichlorosilane with vinyltrichlorosilane in the presence of 10 mol % [Bu$_4$P]Cl at 150° C. for 4 hours. Organometallics, 2010, 29, 3054-3057. The reaction produced a mixture of cis- and trans-1,1,4,4-tetrachloro-2,5-bis(trichlorosilyl)-1,4-disilacyclohexane along with 1,2-bis(trichlorosilyl)ethane and 1,1,2-tris(trichlorosilyl)ethane.

Seung-Hyun Kang et al. disclose dehydrochlorinative Si—C coupling reactions of primary and secondary alkyl chlorides with hydridochlorosilanes in the presence of a TBPC catalyst. Organometallics, 2003, 22, 529-534.

A need remains for methods of synthesizing carbosilanes with high yield and purity.

SUMMARY

Methods of synthesizing carbosilane precursors are disclosed. The carbosilane precursors have the formula $SiH_aR_{4-a}$ wherein a=1 to 3; each R is independently a $C_1$ to $C_{12}$ alkyl group, a $C_3$ to $C_{12}$ aryl group, fused bicyclic aryl groups, or a heterocyclic group, comprising: reacting a halogenated carbosilane having the formula $R_bSiH_cX_{4-b-c}$, wherein b=1 to 3; c=0 to 2; each X is independently a halogen atom selected from Cl, Br or I; each R is independently a $C_1$ to $C_{12}$ alkyl group, a $C_3$ to $C_{12}$ aryl group, fused bicyclic aryl groups, a substituted phenyl group, or a heterocyclic group, with a reducing agent and tetrabutylphosphoniumchloride (TBPC) catalyst.

Methods of synthesizing carbodisilane precursors are also disclosed. The carbodisilane precursors have the formula $Si_2H_{6-z}R_z$ wherein z=1 to 5; each R is independently a $C_1$ to $C_6$ alkyl group, a $C_3$ to $C_{12}$ aryl group, fused bicyclic aryl groups, or a heterocyclic group, comprising: reacting a halogenated carbosilane having the formula $R_ySi_2H_yX_{6-y-z}$, wherein y=0 to 4; z=1 to 4; y+z=1-5; each X is independently a halogen atom selected from Cl, Br or I; each R is independently a $C_1$ to $C_6$ alkyl group, a $C_3$ to $C_{12}$ aryl group, fused bicyclic aryl groups, a substituted phenyl group, or a heterocyclic group, with a reducing agent catalyzed by using tetrabutylphosphoniumchloride (TBPC) as a catalyst.

Either of the disclosed methods may further include one or more of the following aspects:
- 4-b-c=a;
- c=0;
- the reducing agent selectively reducing the halogenated carbosilane to form the carbosilane precursor;
- the reducing agent selectively reducing the halogenated carbodisilane to form the carbodisilane precursor;
- a molar ratio of the reducing agent to the halogenated carbosilane is 0 to 10% over stoichiometric amount;
- maintaining the reaction temperature from approximately 50° C. to approximately 100° C.;
- the halogenated carbosilane having the formula $R_bSiH_cX_{4-b-c}$ wherein b=1 to 3; c=0 to 2; X=a halogen atom (Cl, Br or I); R is a $C_1$ to $C_6$ alkyl group, a $C_3$ to $C_{12}$ aryl group, a substituted phenyl group, or a heterocyclic group;
- the halogenated carbosilane being a carbocholorosilane;
- the halogenated carbosilane being a carbobromosilane;
- the halogenated carbosilane being a carboiodosilane;
- the halogenated carbosilane being a phenyl or aryl substituted halogensilane;
- the halogenated carbosilane being a phenyl or aryl substituted cholorosilane;
- the halogenated carbosilane being a phenyl or aryl substituted bromosilane;
- the halogenated carbosilane being a phenyl or aryl substituted iodosilane;
- the halogenated carbosilane being dichlorodiphenylsilane;
- the halogenated carbosilane being p-tolyltrichlorosilane;
- the carbosilane precursor being diphenylsilane;
- the carbosilane precursor being p-tolylsilane;
- the halogenated carbodisilane being Me$_2$Cl—Si—SiMe$_2$Cl;
- the carbodisilane precursor being Me$_2$HSi—SiHMe$_2$;
- the reducing agent having the formula HSiR$_3$ wherein R is a $C_1$-$C_{12}$ alkyl group;

the reducing agent being triethylsilane; or the reducing agent being trimethylsilane.

Methods of synthesizing a carbosilane precursor having the formula $H_2SiR_2$ or $H_3SiR$ are also disclosed, wherein R is an aryl or phenyl group. A halogenated carbosilane having the formula $R_bSiX_{4-b}$, wherein b=1 or 2; each X is independently a halogen atom selected from Cl, Br or I; and R is an aryl or phenyl group; is reacted with a reducing agent in the presence of a tetrabutylphosphonium chloride (TBPC) catalyst. The disclosed methods may include one or more of the following aspects:

- a molar ratio of the reducing agent to the halogenated carbosilane is 0 to 10% over stoichiometric amount;
- maintaining the reaction temperature from approximately 50° C. to approximately 100° C.;
- the halogenated carbosilane being a carbocholorosilane;
- the halogenated carbosilane being a carbobromosilane;
- the halogenated carbosilane being a carboiodosilane;
- the halogenated carbosilane being dichlorodiphenylsilane;
- the halogenated carbosilane being p-tolyltrichlorosilane;
- the carbosilane precursor being diphenylsilane;
- the carbosilane precursor being p-tolylsilane;
- the reducing agent having the formula $HSiR_3$ wherein R is a $C_1$-$C_{12}$ alkyl group;
- the reducing agent being triethylsilane; or
- the reducing agent being trimethylsilane.

Notation and Nomenclature

The following detailed description and claims utilize a number of abbreviations, symbols, and terms, which are generally well known in the art. While definitions are typically provided with the first instance of each acronym, for convenience, Table 1 provides a list of the abbreviations, symbols, and terms used along with their respective definitions.

TABLE 1

| | |
|---|---|
| a or an | One or more than one |
| Approximately or about | ±10% of the value stated |
| LAH | lithium aluminum hydride |
| GCMS | gas chromatography/mass spectrometry |
| Alkyl group | saturated functional groups containing exclusively carbon and hydrogen atoms, including linear, branched, or cyclic alkyl groups |
| Me | Methyl |
| Et | Ethyl |
| aryl | aromatic ring compounds where one hydrogen atom has been removed from the ring |
| heterocycle | cyclic structures that contain atoms of at least two different elements as members of its ring |
| TBPC | tetrabutylphosphoniumchloride |
| TBAC | Tetrabutylammoniumchloride |

As used herein, the term "independently" when used in the context of describing R groups should be understood to denote that the subject R group is not only independently selected relative to other R groups bearing the same or different subscripts or superscripts, but is also independently selected relative to any additional species of that same R group. For example in the formula $MR^1_x$ $(NR^2R^3)_{(4-x)}$, where x is 2 or 3, the two or three $R^1$ groups may, but need not be identical to each other or to $R^2$ or to $R^3$. Further, it should be understood that unless specifically stated otherwise, values of R groups are independent of each other when used in different formulas.

The standard abbreviations of the elements from the periodic table of elements are used herein. It should be understood that elements may be referred to by these abbreviations (e.g., Si refers to silicon, N refers to nitrogen, 0 refers to oxygen, C refers to carbon, etc.).

Any and all ranges recited herein are inclusive of their endpoints (i.e., x=1 to 4 includes x=1, x=4, and x=any number in between), irrespective of whether the term "inclusively" is used.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
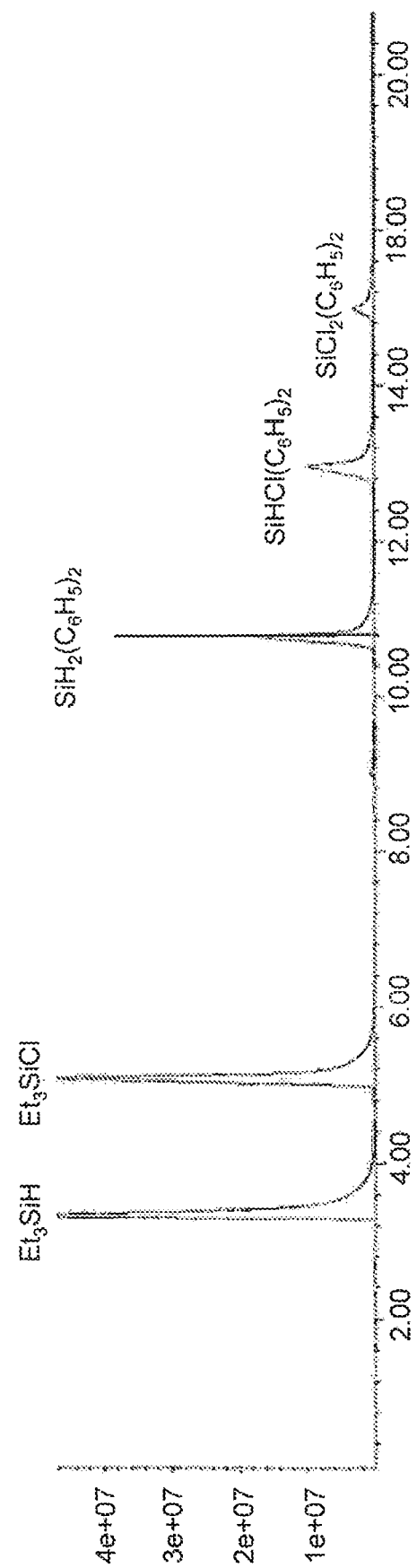
FIG. 1 is a gas chromatogram/mass spectrum of the reaction product of Example 1.

Methods of selectively synthesizing carbosilane and carbodisilane compounds are disclosed.

The carbosilane compounds have the formula $SiH_aR_{4-a}$ wherein a=1 to 3; R is a $C_1$ to $C_{12}$ alkyl group, a $C_3$ to $C_{12}$ aryl group, fused bicyclic aryl groups, a substituted phenyl group, or a heterocyclic group. The carbodisilane precursors have the formula $Si_2H_{6-z}R_z$ wherein z=1 to 5; each R is independently a $C_1$ to $C_6$ alkyl group, a $C_3$ to $C_{12}$ aryl group, fused bicyclic aryl groups, or a heterocyclic group. These compounds may be used as precursors to form Si-containing films or Si-containing coatings in the field of ceramics, optical coatings, electronics (i.e., devices), semiconductors (i.e., components), hydrogen storage, and semiconductor components that may be used at least in electronic devices. In some embodiments, R=phenyl or substituted phenyl to produce arylsilanes.

Exemplary carbosilane compounds include, but are not limited to, $H_3Si(C_6H_5)$, $H_2Si(C_6H_5)_2$, $HSi(C_6H_5)_3$, $H_3Si(C_6H_4Me)$, $H_2Si(C_6H_4Me)_2$, $HSi(C_6H_4Me)_3$, $H_3Si(C_5H_5)$, $H_2Si(C_5H_5)_2$, $HSi(C_5H_5)_3$, $H_3Si(C_9H_7)$, $H_2Si(C_9H_7)_2$, HSi $(C_9H_7)_3$, $H_3Si(C_{10}H_7)$, $H_2Si(C_{10}H_7)_2$, $HSi(C_{10}H_7)_3$, $H_3Si(C_8H_7)$, $H_2Si(C_8H_7)_2$, $HSi(C_8H_7)_3$, $H_3Si(C_9H_9)$, $H_2Si(C_9H_9)_2$, $HSi(C_9H_9)_3$, $H_3Si(C_{10}H_{11})$, $H_2Si(C_{10}H_{11})_2$, or $HSi(C_{10}H_{11})_3$.

Exemplary carbosilane compounds wherein a=2 and R=phenyl or a=3 and R=tolyl include $SiH_2(C_6H_5)_2$ or $SiH_3(C_6H_4Me)$, respectively.

Exemplary carbodisilane compounds include, but are not limited to, $Me_2HSi-SiHMe_2$; $Et_2HSi-SiHEt_2$; $iPr_2HSi-SiHiPr_2$; $tBu_2HSi-SiHtBu_2$; $MeH_2Si-SiH_2Me$; $EtH_2Si-SiH_2Et$; $iPrH_2Si-SiH_2iPr$; $tBuH_2Si-SiH_2tBu$; $(C_6H_5)H_2Si-SiH_2(C_6H_5)$; $(C_6H_5)_2HSi-SiH(C_6H_5)_2$; $(C_6H_4Me)H_2SiSiH_2(C_6H_4Me)$; $(C_6H_4Me)_2HSiSiH(C_6H_4Me)_2$; $(C_5H_5)H_2SiSiH_2(C_5H_5)$; or $(C_5H_5)_2HSiSiH(C_5H_5)_2$.

The disclosed carbosilane or carbodisilane compounds are synthesized by catalytic reduction of halogenated carbosilanes or halogenated carbodisilanes, respectively, by using a tetrabutylphosphoniumchloride catalyst ($nBu_4PCl$ or TBPC). The halogenated carbosilanes have the formula $R_bSiH_cX_{4-b-c}$ wherein b=1 to 3; c=0 to 2; X=a halogen atom (Cl, Br or I); R is a $C_1$ to $C_{12}$ alkyl group, a $C_3$ to $C_{12}$ aryl group, fused bicyclic aryl groups, a substituted phenyl group, or a heterocyclic group. These compounds are commercially available or may be synthesized by methods known in the art. In some embodiments, the halogenated carbosilanes may be carbochlorosilanes, carbobromosilanes, or carboiodosilanes. In particular, the halogenated carbosilanes may be phenyl or aryl substituted halosilanes. Exemplary phenyl or aryl substituted halosilanes include phenyl or aryl substituted chlorosilanes, phenyl or aryl substituted bromosilanes, or phenyl or aryl substituted iodosilanes.

Phenyl or aryl substituted halosilanes may be selectively reduced using the disclosed methods. In general arylhalosilanes are more stable than their alkyl counterparts and resist towards such halide exchange reactions. By using TBPC as a catalyst, however, the halide exchange reactions to the arylsilanes may be carried out.

As shown in the examples that follow, Applicants have surprisingly discovered that high yields of the desired phenyl or aryl carbosilane compound may be obtained when the "4-b-c" value of the halogenated carbosilane equals the "a" value of the carbosilane compound. More particularly, high yields of the $SiH_2R_2$ compound are obtained when 4-b-c=a=2, when R=phenyl or aryl. Similarly, high yields of the $SiH_3R$ compound are obtained when 4-b-c=a=3.

The halogenated carbodisilanes have the formula $R_zSi_2H_yX_{6-y-z}$, wherein y=0 to 4; z=1 to 4; y+z=1-5; each X is independently a halogen atom selected from Cl, Br or I; each R is independently a $C_1$ to $C_6$ alkyl group, a $C_3$ to $C_{12}$ aryl group, fused bicyclic aryl groups, a substituted phenyl group, or a heterocyclic group. These compounds are commercially available or may be synthesized by methods known in the art. Exemplary halogenated carbodisilane compounds include carbochlorodisilanes, carbobromodisilanes, or carboiododisilanes such as $Me_2ClSi-SiClMe_2$; $Et_2BrSi-SiBrEt_2$; $iPr_2ISi-SiIiPr_2$; $tBu_2ClSi-SiCltBu_2$; $MeBr_2Si-SiBr_2Me$; $EtI_2Si-SiI_2Et$; $iPrCl_2Si-SiCl_2iPr$; or $tBuBr_2Si-SiBr_2tBu$. In particular, the halogenated carbodisilanes may be phenyl or aryl substituted halodisilanes. Exemplary phenyl or aryl substituted halodisilanes include phenyl or aryl substituted chlorodisilanes, phenyl or aryl substituted bromodisilanes, or phenyl or aryl substituted iododisilanes, such as $(C_6H_5)I_2Si-SiI_2(C_6H_5)$; $(C_6H_5)_2ClSi-SiCl(C_6H_5)_2$; $(C_6H_4Me)Br_2SiSiBr_2(C_6H_4Me)$; $(C_6H_4Me)_2ISiSiI(C_6H_4Me)_2$; $(C_5H_5)Cl_2SiSiCl_2(C_5H_5)$; or $(C_5H_5)_2BrSiSiBr(C_5H_5)_2$.

The reducing agent may be a trialkylsilane having the formula $HSiR'_3$ wherein R' is a $C_1$-$C_{12}$ alkyl group. These compounds are commercially available or may be synthesized by methods known in the art. Exemplary reducing agents include, but are not limited to, trimethylsilane or triethylsilane. The reduction produces a trimethylhalosilane or triethylhalosilane by-product that is easy to separate from the carbosilane or carbodisilane product.

The disclosed synthesis method may be a solvent free process. The reduction process may be controlled by reaction temperature, reaction time and/or by stoichiometry of the reducing agent. Different reaction temperatures and reaction times may produce different products. The reaction temperature may range from approximately 50° C. to approximately 100° C. A molar ratio of the reducing agent to the carbohalosilane or carbodihalosilane may range from approximately 0% to approximately 10% over the stoichiometric amount.

The disclosed synthesis method may be a selective reduction to the halogenated carbosilanes. The selective reduction may be achieved by varying the stoichiometric amount of the reducing agent. By this way, the disclosed synthesis method may allow making new exotic compounds when only selected number of halogens in the reactant halogenated carbosilanes is reduced and the new exotic molecules may be selectively synthesized in one step. For example, in the reaction of dicholorodiphenylsilane reduced by trimethylsiance using TBPC, if one chlorine is selected to be reduced, cholorodiphenylsilane may be produced with by-product trimethylcholorosilane which is easy to separate from the product.

The disclosed synthesis method allows 100% quantitative conversion and a yield around 72-80% after purification. The disclosed synthesis method is much safer than the conventional LAH reduction method because there is no slurry formed in the disclosed synthesis methods. Unlike the conventional LAH method that results in large amount of aqueous waste, the disclosed synthesis method allows minimal waste profile. Since the by-product is trialkylchlorosilane, the product purification is less tedious.

One of ordinary skill in the art will recognize the sources for the equipment components of the systems used to practice the disclosed methods. Some level of customization of the components may be required based upon the desired temperature range, pressure range, local regulations, etc. Exemplary equipment suppliers include Buchi Glass Uster AG, Shandong ChemSta Machinery Manufacturing Co. Ltd., Jiangsu Shajabang Chemical Equipment Co. Ltd, etc. As discussed above, the components are preferably made of corrosion resistant materials, such as glass, glass-lined steel, or steel with corrosion resistant liners, etc.

EXAMPLES

The following non-limiting examples are provided to further illustrate embodiments of the invention. However, the examples are not intended to be all inclusive and are not intended to limit the scope of the inventions described herein.

Example 1

Synthesis of Diphenylsilane

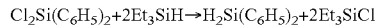

$$Cl_2Si(C_6H_5)_2 + 2Et_3SiH \rightarrow H_2Si(C_6H_5)_2 + 2Et_3SiCl$$

Dichlorodiphenylsilane (2 g, 7.9 mmol) was added to a reactor. The catalyst TBPC (0.2 g, 0.79 mmol) was added to the reactor to form a solution with dichlorodiphenylsilane. Triethylsilane (2 g, 17.4 mmol) was added to the resulting solution at room temperature under inert atmosphere. The resulting reaction mixture was heated to 100° C. for 15 hr. The reaction mixture was then cooled to ambient temperature. FIG. 1 is the gas chromatography/mass spectrum (GCMS) of the reaction mixture. FIG. 1 shows the peaks corresponding to the dichlorodiphenylsilane ($SiCl_2(C_6H_5)_2$) and triethylsilane ($Et_3SiH$) starting materials and the diphenylsilane ($SiH_2(C_6H_5)_2$) and triethylchlorosilane ($Et_3SiCl$) reaction products. In this preliminary R&D reaction, a small amount of $SiHCl(C_6H_5)_2$ was also produced. The GCMS showed 93% conversion of dichlorodiphenylsilane and the non-isolated yield determined by GC analysis was ~60%. As can be seen, the majority of reactants are converted to the desired reaction products. Only a small amount of the $SiHCl(C_6H_5)_2$ disproportionation product was produced.

Example 2

Small Scale Synthesis of p-Tolylsilane

Figure 2:
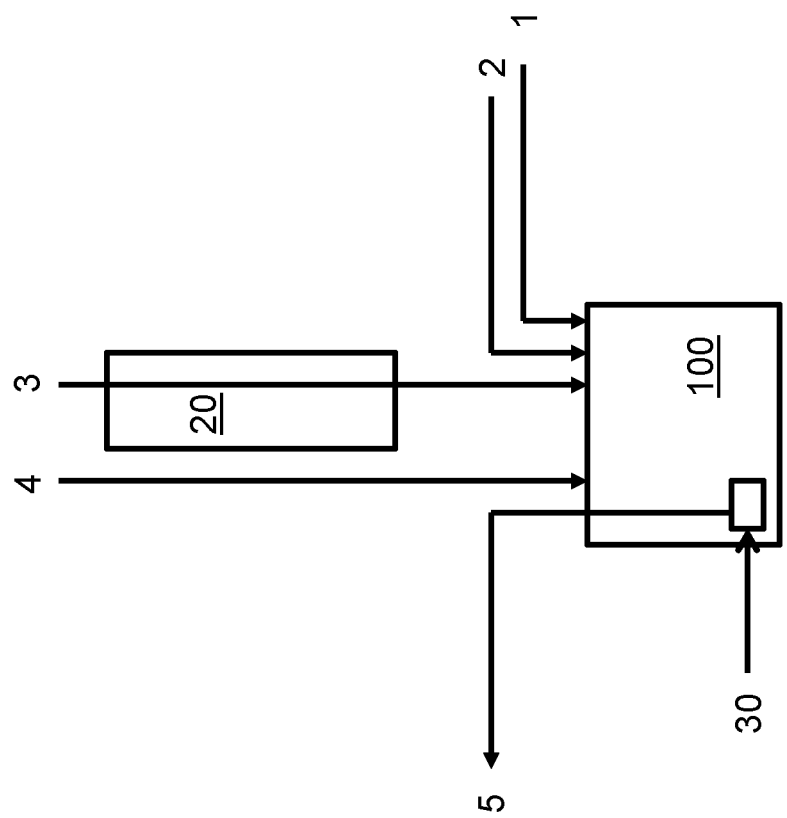
FIG. 2 is a schematic diagram of the one pot synthesis components utilized in Example 2.
Figure 3:
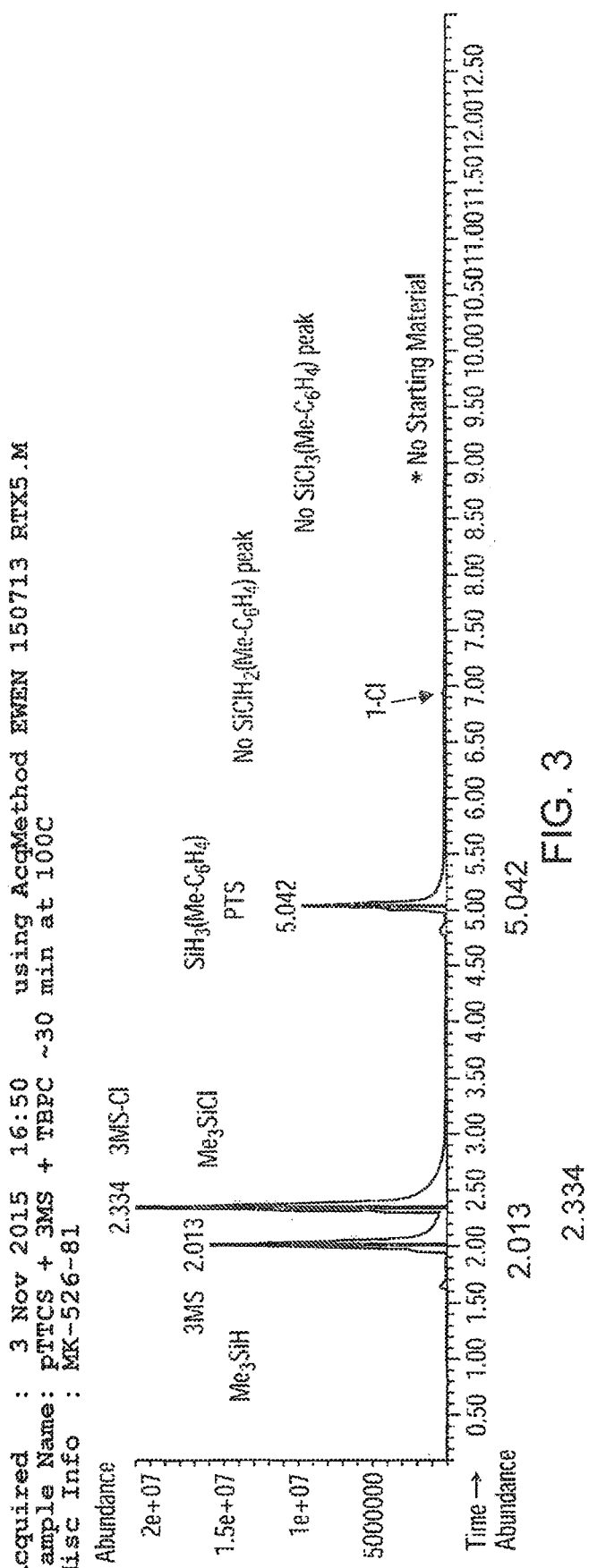
FIG. 3 is a gas chromatogram/mass spectrum of the reaction product of Example 2.

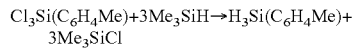

$$Cl_3Si(C_6H_4Me) + 3Me_3SiH \rightarrow H_3Si(C_6H_4Me) + 3Me_3SiCl$$

p-tolyltrichlorosilane 1 (1.3 g, 5.8 mmol) and TBPC 2 (0.13 g, 0.4 mmol) were added to the reactor 100 of FIG. 2. 3.3 mol equivalents of trimethylsilane 3 (1.4 g, 19.1 mmol) were condensed at −78° C. under inert atmosphere using condenser 20 into the reactor 100. The resulting reaction mixture was heated to 100° C. for 30 min. At this point, the pressure dropped significantly, indicating that the reaction was nearly complete. The reaction mixture was cooled to ambient temperature. The crude reaction product 5 was removed through filter 30 and line 5. Any volatile reaction products in line 5 are captured in the liquid nitrogen cryotrap 50. The crude reaction product was subject to GCMS analysis. FIG. 3 is the GCMS of the reaction mixture. FIG. 3 shows the peaks corresponding to the trimethylsilane ($Me_3SiH$) starting material and the p-tolylsilane ($SiH_3(Me-C_6H_4)$) and trimethylchlorosilane ($Me_3SiCl$) reaction products. The GCMS analysis showed complete conversion of p-tolyltrichlorosilane. The non-isolated yield was 82%.

Example 3

Scale Up Synthesis of p-Tolylsilane

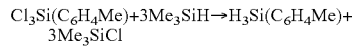

$$Cl_3Si(C_6H_4Me) + 3Me_3SiH \rightarrow H_3Si(C_6H_4Me) + 3Me_3SiCl$$

p-tolyltrichlorosilane (90 g, 0.4 mol) and TBPC (11.8 g, 0.04 mol) were added to a stainless steel pressure reactor. 3.3 mol equivalents of trimethylsilane (97.7 g, 1.3 mol) were added to the reactor forming a solution. The reactor was sealed and heated to 100° C. for 30 min. The reactor was cooled. The volatiles in the reaction mixture were cryotrapped in a stainless steel lecture bottle. The $H_3Si(C_6H_4Me)$ product was distilled under reduced pressure (1 Torr) at 30° C. The yield of the product was 36.2 g (0.29 mol; 74%).

Example 4

Catalyst Activity

The p-tolylsilane synthesis reaction was repeated 10 times using the same catalyst in the same reactor system as shown in FIG. 2. Table 2 below summarizes the mass balances for the 10 reactions. More particularly, 10.38 kg (46 moles) of $Cl_3Si(Me-C_6H_4)$ was converted by 130 g (0.44 moles) of the TBPC catalyst. This is a turnover number of 105 (46 moles/0.44 moles).

TABLE 2

| $Cl_3Si(Me-C_6H_4)$ | $Me_3SiH$ (g) | Total In (g) | Lights Removed (g) | $Me_3SiCl$ | $H_3Si(Me-C_6H_4)$ | Total Out (g) | Δ (g) |
|---|---|---|---|---|---|---|---|
| 10384 | 11517 | 21901 | 738 | 14461 g | 5693 g | 20892 | 1009 |
| Theoretical | | | | 15.003 kg | 5.63 kg | | |
| GC % | | | | 14.45 kg | 5.60 kg | | |
| Non-isolated Yield | | | | 13.2 kg | 4.6 kg | | |
| % Non-isolated Yield over Theoretical Yield | | | | 88% | 82% | | |

Δ = Total In − Total Out

What is claimed is:

1. A method of synthesizing a carbosilane compound having the formula

wherein a=1 to 3 and R is a $C_1$ to $C_{12}$ alkyl group, a $C_3$ to $C_{12}$ aryl group, fused bicyclic aryl groups, a substituted phenyl group, or a heterocyclic group, comprising:

reacting a halogenated carbosilane having the formula $R_bSiH_cX_{4-b-c}$, wherein b=1 to 3; c=0 to 2; b+c=1 to 3; X=a halogen atom (Cl, Br or I); and R is a $C_1$ to $C_{12}$ alkyl group, a $C_3$ to $C_{12}$ aryl group, fused bicyclic aryl groups, a substituted phenyl group, or a heterocyclic group, with a reducing agent catalyzed by using tetrabutylphosphoniumchloride (TBPC) as a catalyst.

2. The method of claim 1, wherein the reducing agent has the formula $HSiR_3$ wherein R is a $C_1$-$C_{12}$ alkyl group.

3. The method of claim 1, wherein a=4-b-c.

4. The method of claim 3, wherein c=0.

5. The method of claim 4, wherein the reaction yields between approximately 60% w/w and approximately 80% w/w of the carbosilane compound.

6. The method of claim 1, wherein the reducing agent is selected from the group consisting of triethylsilane, trimethylsilane, and combinations thereof.

7. The method of claim 1, wherein the halogenated carbosilane is a phenyl or aryl substituted carbohalosilane.

8. The method of claim 7, wherein the phenyl or aryl substituted carbohalosilane is dichlorodiphenylsilane.

9. The method of claim 7, wherein the phenyl or aryl substituted carbohalosilane is p-tolyltrichlorosilane.

10. The method of claim 1, wherein a molar ratio of the reducing agent to the halogenated carbosilane is 0 to 10% mol/mol over stoichiometric amount.

11. The method of claim 1, wherein the halogenated carbosilane reduced by the reducing agent is a selective reduction.

* * * * *